June 2, 1936. J. MIESSE 2,043,185
REAR AXLE FOR AUTOMOTIVE VEHICLES
Filed Oct. 2, 1935 5 Sheets-Sheet 1
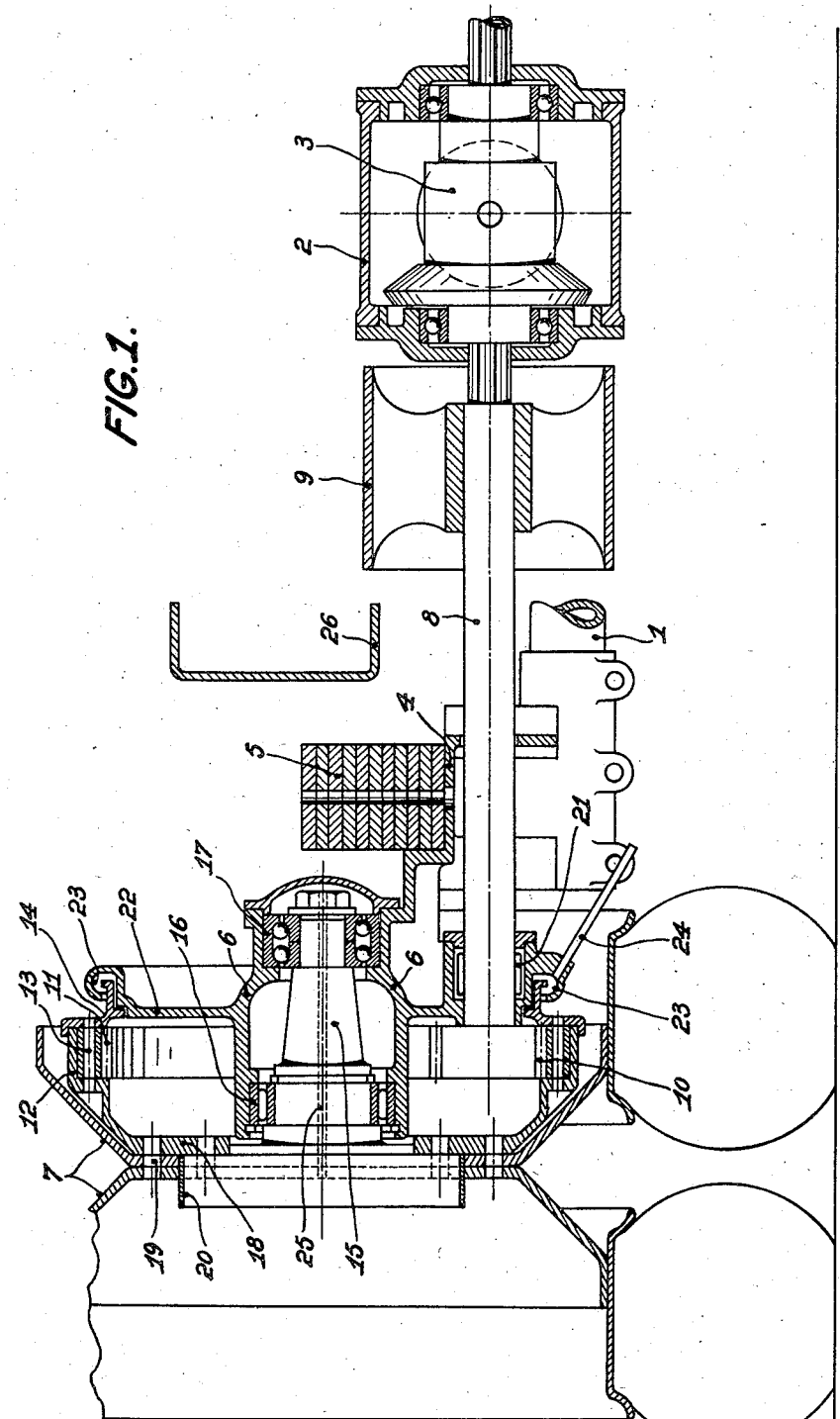

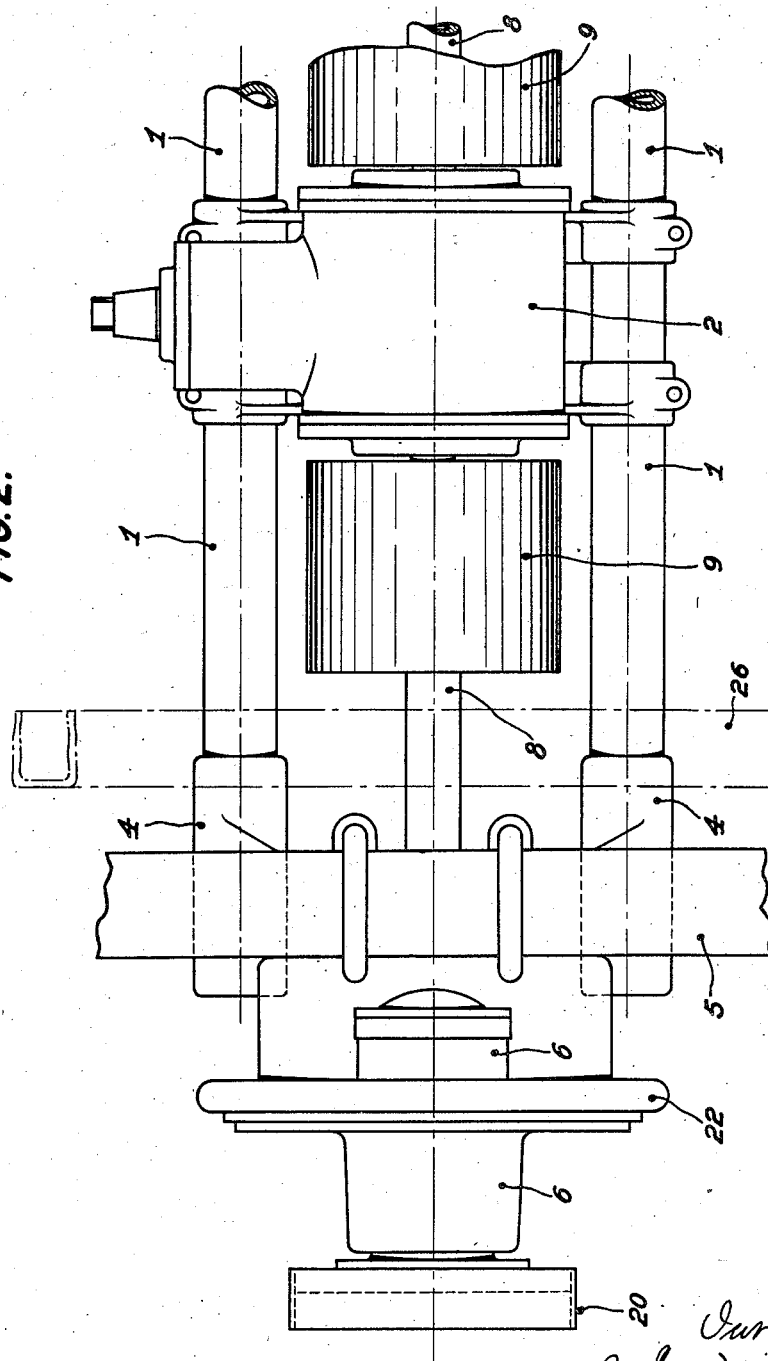

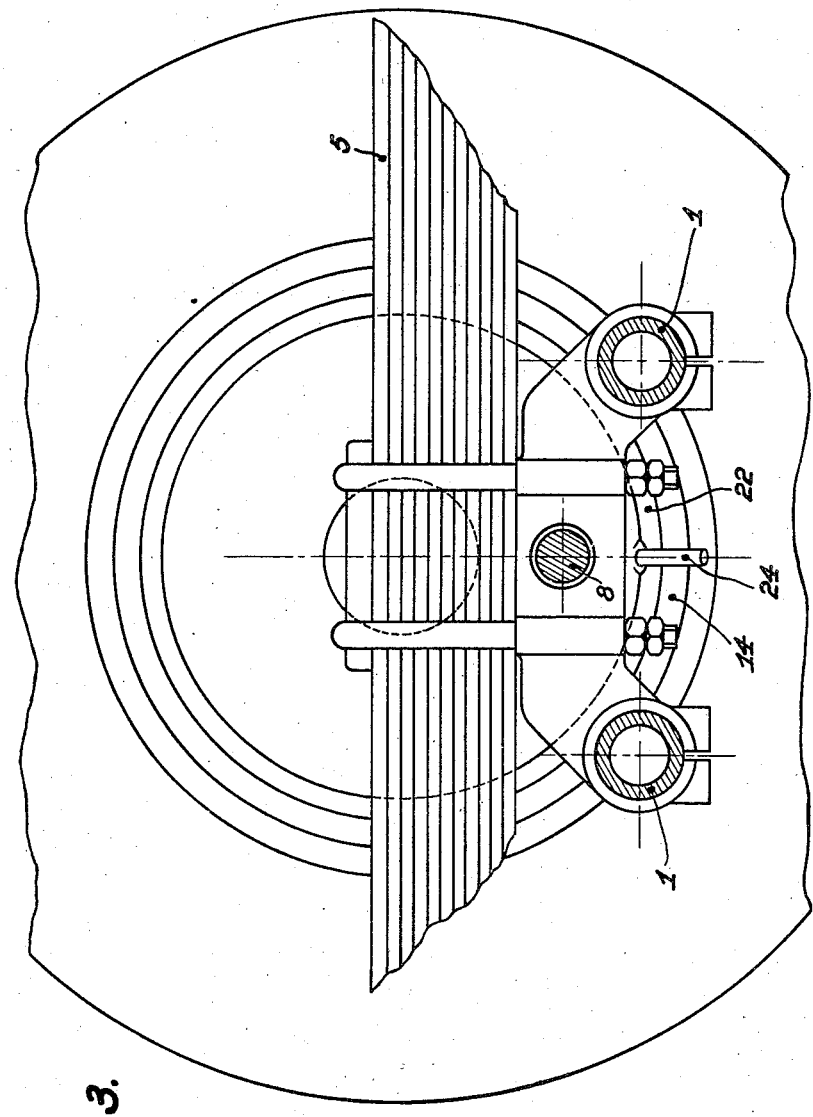

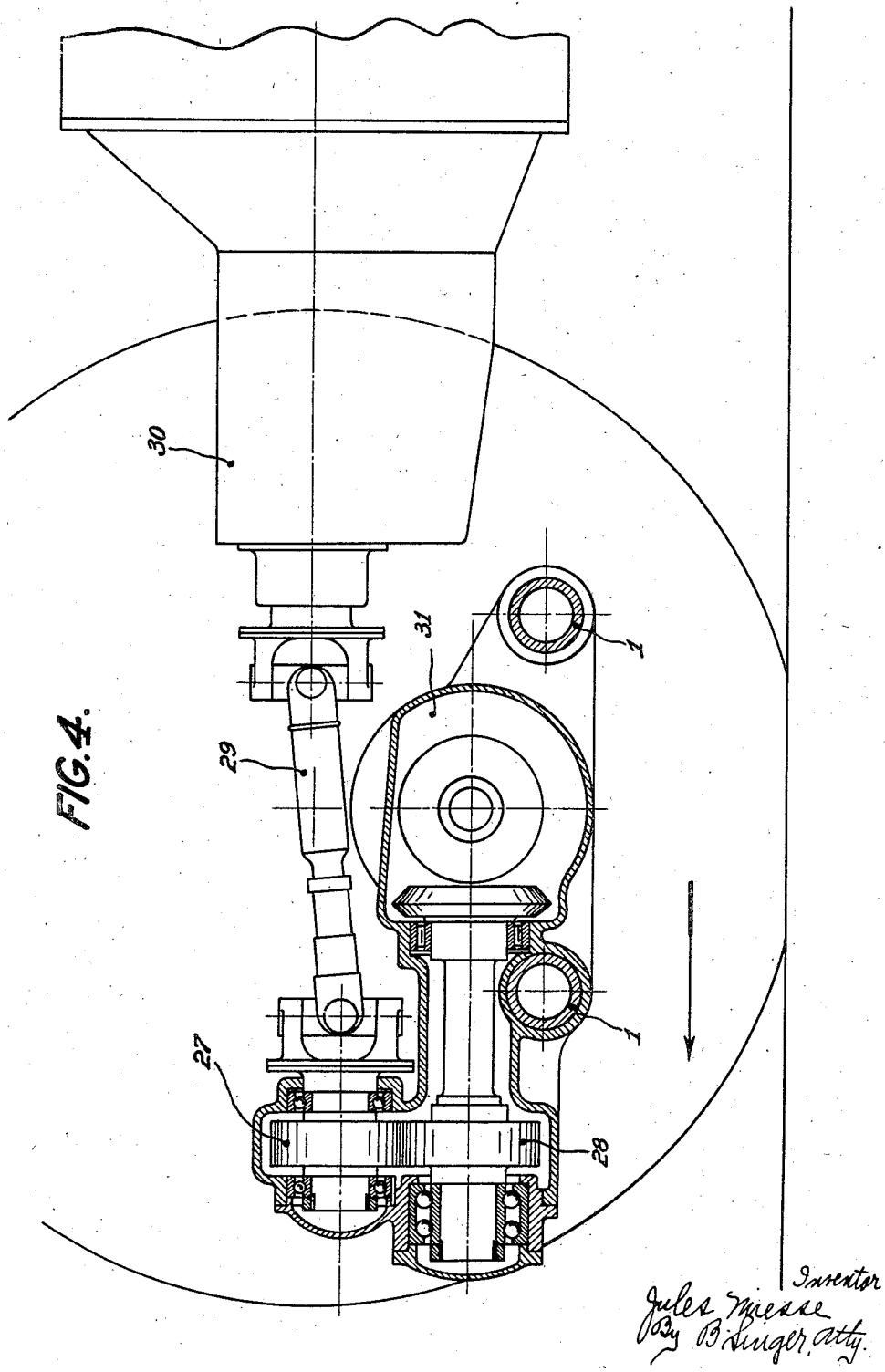

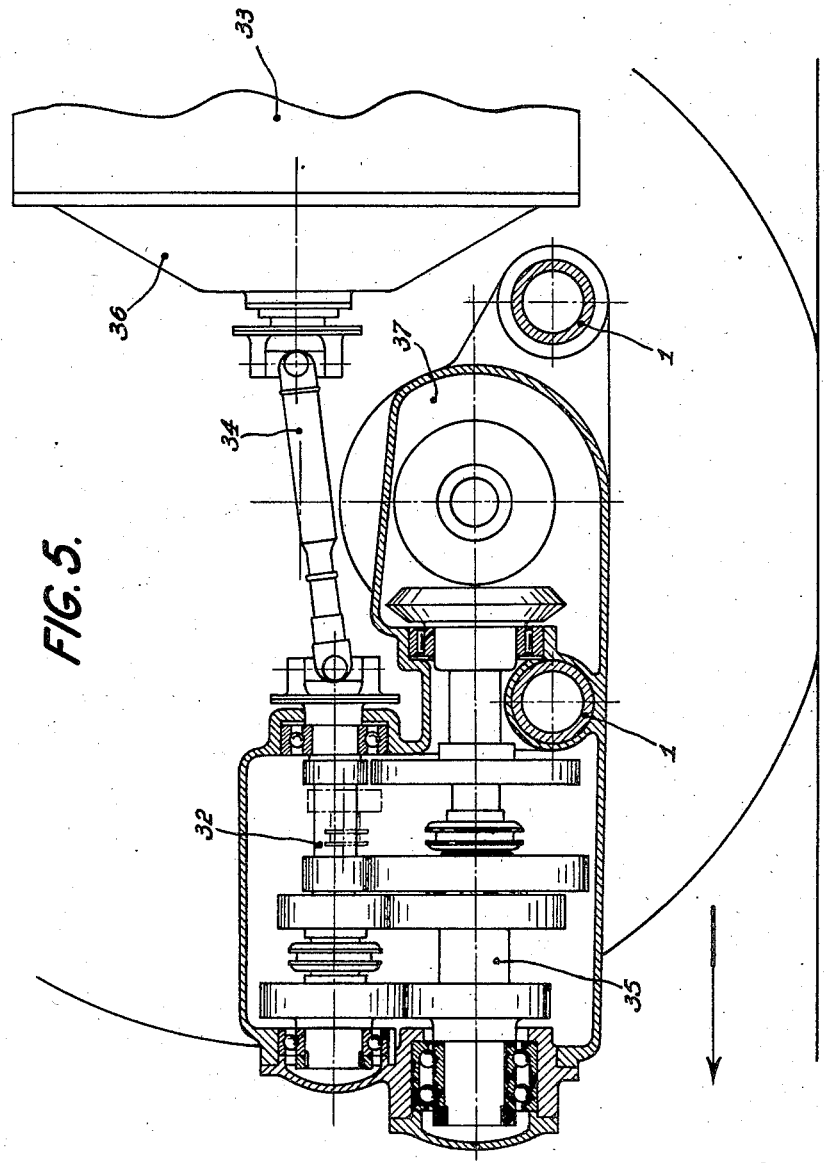

Patented June 2, 1936

2,043,185

UNITED STATES PATENT OFFICE 2,043,185

REAR AXLE FOR AUTOMOTIVE VEHICLES

Jules Miesse, Brussels, Belgium

Application October 2, 1935, Serial No. 43,235
In Belgium April 11, 1935

6 Claims. (Cl. 180—75)

My invention has for its object a rear axle or differential drive assembly for automotive vehicles, more particularly for commercial vehicles, enabling to design a chassis as low above the ground as possible, while using perfectly straight longitudinal frame members, i. e. frame members having no drops or portions of reduced section above the said rear drive assembly.

It is known that in existing chassis frames for lorries and, more particularly, for busses, the height of the frame above the ground can be reduced merely in the portion intended for the body, while the portion adjacent the rear wheels shows generally a drop, or a reduction in vertical dimensions of the longitudinal member, to leave space for the rear axle and allow for the jounce space of the said axle when the latter is provided for driving the wheels axially. As a result of the known arrangement the strength of the frame is reduced, or the structure thereof is complicated, which in turn makes it impossible to design bodies having a flat base extending over the space intended for the body. Moreover, the provision of the drop or bend, involves one single position of the rear axle in each type of chassis frame.

In the arrangement according to my invention, the driving members for the rear wheels, instead of being provided axially of the latter, are arranged beneath the axis thereof. Owing to this arrangement, the driving shafts for the wheels do not interfere with the provision of a straight or rectilinear longitudinal frame member whose height above the ground may thus be greatly reduced, while making the said frame member of convenient cross section.

Further, inasmuch as the cross section of the longitudinal frame member may be made uniform throughout the length of the chassis, the differential casing may be mounted at any desired point, thus allowing for various wheel bases.

The aforesaid advantages are particularly appreciated when the engine is mounted at the rear of the chassis, such as when it is desired to design a bus having the largest possible loading area.

Simply by way of example, certain embodiments of the object of my invention will be hereinafter described with reference to the accompanying drawings, in which:

Fig. 1 is a longitudinal section of part of a rear or drive axle or differential assembly according to my invention, the drive of the axle in this instance being taken from an engine mounted at the front of the chassis.

Fig. 2 is a plan view corresponding to Fig. 1, the wheels being not shown.

Fig. 3 is a corresponding cross section viewed from the chassis, and lying in a vertical plane adjacent the suspension spring.

Figs. 4 and 5 are fragmentary views partly in section, showing two embodiments in which the rear or drive axle is driven from an engine mounted at the rear of the chassis.

As shown in Figs. 1 to 3, the differential drive assembly proper or rear axle comprises two tubes 1, the central portions of which support a casing 2 enclosing the drive gear and the associated differential gear 3, said tubes being provided at their outer ends with bearings for the suspension springs 5 and with brackets 6 for the wheels 7.

The driving shafts 8 for the wheels 7 have fixed thereon brake drums 9, the inner and outer brake mechanism and the operating means therefor being likewise supported by the tubes 1. The driving shafts 8 being made to telescope into the differential will allow the mechanism according to my invention to suit any frame width or gauge.

Each of the shafts 8 driven from the differential 3 has mounted on its outer end a pinion 10 meshing with an internally toothed wheel 11. The toothed wheel 11 is fitted into a drum 12 and fastened thereto by means of bolts 13 which also act to maintain a flanged annular member 14 providing an oil casing and baffle.

The bracket 6 provides a support for a stub axle 15 mounted on pin or ball bearings 16 and 17, of which the latter forms a thrust bearing.

The stub axles support each a web 18 to which the wheel or wheels may be fixed and which is driven by the drum 12 to which it is fastened by bolts or rivets 19. The web 18 supported on the stub axle bears a further annular or sleeve member 20 designed to provide a guide for the wheel 7 when the latter is being mounted on the stub axle or taken off therefrom. The bracket 6 also supports the driving shaft 8 by means of a pin or ball bearing 21. The bracket 6 is provided with a flange 22 having a peripheral oil collecting groove 23. The cylindrical part of the annular member 14 forming an oil baffle is engaged and rotates in said groove. An oil over-flow tube 24 is provided at the lowermost point of the groove 23. The respective dimensions of the annular baffle 14 and the web 22 are such that a convenient oil level is constantly maintained at the height of mesh between the pinion 10 and the internally toothed wheel 11.

The whole of the wheel driving assembly just described is lubricated by oil entering through duct 25 bored from end to end axially throughout the stub axle 15, the oil admitted through the duct 25 being allowed to flow through the bearings 17 and 16 towards the pinion 10, passing between the end of the bracket 6 and the inner edge of the web 18, the oil splash occurring between the annular member 14 and the web 22 being collected in the annular groove 23.

As will be seen more particularly from Fig. 1, the above described rear axle arrangement provides for a considerable reduction of the height of the longitudinal frame member 26 above the ground, thus enabling to make the said frame member of rectilinear form and uniform section throughout the length of the chassis.

Moreover, it is to be noted that the following advantages result from the double decrease in speed ratio obtained by providing the differential gear 3 and the pinion 10:

(1) A bevel wheel and crown drive gear of small dimensions may be used, thus leaving more space between the casing 2 and the ground than in the usual construction.

(2) A very efficient and silent drive of the wheels is obtained, considering the provision of an internally toothed wheel.

On the other hand, the efficiency of the brakes is increased, inasmuch as the latter is mounted on the wheel drive shafts instead of being mounted directly on the wheels, as hitherto, so that the braking action is increased in proportion as the gear ratio is decreased.

Finally, the rigidity of the mechanism and the proper alignment of the parts are secured by the two tubes 1 which form together with the end brackets and the central casing or box a more sturdy assembly than the usual rear axle structures.

Where the engine is mounted at the rear of the chassis, it is desirable for the said engine to be placed as closely as possible to the rear axle, in order to reduce the overhanging part of the chassis behind the wheels. If the usual arrangement be maintained, viz.: engine, clutch with gear box, and drive axle disposed in sequence the whole assembly would become too bulky, even if use were made of a very short cardan shaft with the resulting inconvenience of an unsatisfactory operation of the cardan joints.

According to my invention, the drive of the differential gear is still effected at the front of the rear axle; however, instead of being transmitted directly by the cardan shaft the drive is transmitted through one or more gear drives operated from the rear.

Two embodiments, including rear and drive arrangements are shown in Figs. 4 and 5, in which the arrows indicate the direction of travel of the vehicle.

As shown in Fig. 4, the gears 27, 28 are driven from the cardan shaft 29 connected to the gear box 30. Owing to this arrangement, the gear box may be placed as closely as possible to the rear axle 31. Furthermore, owing to the decrease in speed ratio obtained through the particular design of the wheel drive mechanism, the bevel wheel and crown drive gear for the wheel drive or differential shafts may be made compact, so that a differential casing of relatively small dimensions may be employed, thus allowing for a very short distance to be provided between the cardan shaft and the wheel drive or differential shafts.

Consequently, the rear or drive axle assembly may be placed beneath straight longitudinal frame members, thus providing for the design of a chassis frame which would be low above the ground and would not interfere with the adjacent parts of the driving mechanism.

Fig. 5 shows an arrangement whereby the engine may be brought still closer to the rear axle. In this arrangement, the gear box is mounted in front of the rear axle and is integral with the rear drive axle casing.

The primary shaft 32 is driven from the motor 33 by means of a cardan shaft 34 and drives in turn the secondary shaft 35 through a series of gears providing the desired number of speeds and the required speed ratios. In the latter arrangement, the clutch is the only part interposed between the engine and the rear axle 37, so that the two latter units are brought as closely as possible to each other, while providing for a convenient length of the cardan shaft.

It is to be noted that, owing to the arrangement according to my invention, the engine, whatever be its length, may be placed longitudinally of the vehicle, without requiring any change in the chassis thereof. The longitudinal position of the engine secures a better distribution of weight and a better balancing than in the case of an engine placed transversely of the chassis, in which case special brackets must be provided on the longitudinal frame members.

What I claim is:

1. In an automotive vehicle, a rear axle formed of two transverse tubes arranged beneath the axis of the wheels, a drive gear supported on the central portions of said tubes, suspension spring bearings and wheel brackets supported on the outer ends of said tubes, stub axles rotatably mounted on the wheel brackets, a web integral with each stub axle and providing a wheel attachment, a drum integral with said web, an internally toothed gear fixed to said drum, two shafts connected to the central drive unit and extending each on one side thereof, a pinion fixed at the outer end of each of said shafts and in mesh with the said internally toothed gear, the said shafts and pinions being arranged beneath the axis of the wheels.

2. In a vehicle according to claim 1, a casing enclosing the internally toothed gear and formed by the wheel bracket, a flange integral with said wheel bracket and provided with an outer rim forming a peripheral groove, the web integral with the stub axle, the drum integral with said web and an annular member fixed laterally to said drum end engaged in the said peripheral groove, and a single oil supply duct bored in the stub axle.

3. In a vehicle according to claim 1, a cylindrical sleeve member on the web integral with the stub axle, for guiding the wheel when the latter is being mounted or taken off.

4. In a vehicle according to claim 1, brakes mounted on said wheel drive shafts.

5. In a vehicle according to claim 1, an engine arranged at the rear of the vehicle frame behind the rear axle and longitudinally of the vehicle, a gear box for the engine likewise arranged behind the rear axle, one cardan joint at the drive output end of the gear box, a transmission shaft connected to said cardan joint and extending above the rear axle, a second cardan joint provided at the opposite end of the said transmission shaft, a first shaft connected to said second cardan joint and rotatably mounted in a casing supported by the axle, a second shaft mounted in the said casing and connected to the differential gear, and two pinions mounted on the said first and second shafts, said two pinions being in constant mesh.

6. In a vehicle according to claim 1, an engine arranged at the rear of the vehicle frame behind the rear axle and longitudinally of the vehicle, a first cardan joint connected to the said engine, a transmission shaft connected to said cardan joint and extending above the rear axle, a second cardan joint provided at the opposite end of said transmission shaft, a first shaft connected to said second cardan joint, and rotatably mounted in a casing supported by the axle, a second shaft mounted in said casing and connected to the differential gear, and various gear drives mounted on said shafts for securing the various speed ratios between the latter.

JULES MIESSE.